Sept. 28, 1943.  J. E. F. GOBIN DIT DAUDÉ  2,330,573
SNAP FASTENER SOCKET
Filed Oct. 8, 1941  2 Sheets-Sheet 1
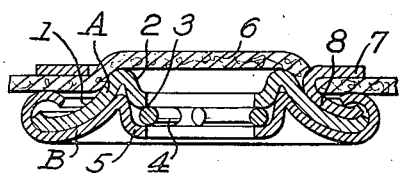
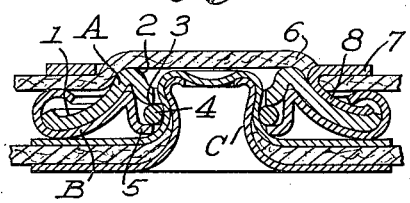
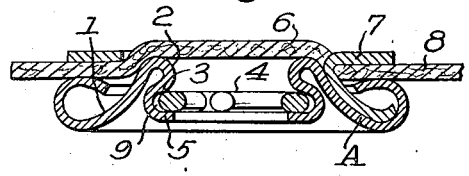
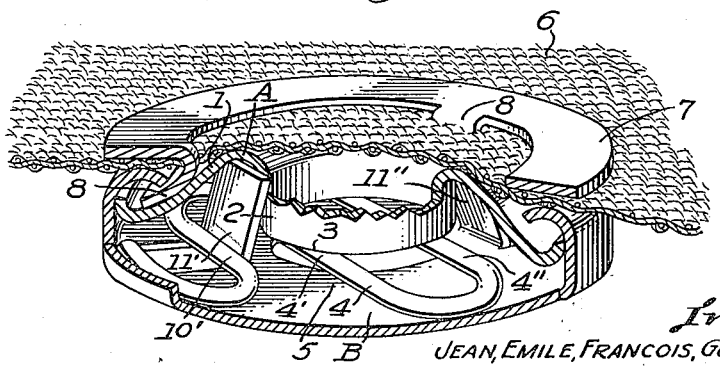
Inventor:
JEAN, EMILE, FRANCOIS, GOBIN DIT DAUDE
By Allen Holcombe
Attorney.

Sept. 28, 1943.   J. E. F. GOBIN DIT DAUDÉ   2,330,573
SNAP FASTENER SOCKET
Filed Oct. 8, 1941   2 Sheets-Sheet 2

Inventor:
JEAN, EMILE, FRANCOIS, GOBIN DIT DAUDÉ
By Allen Holcombe
Attorney.

Patented Sept. 28, 1943

2,330,573

UNITED STATES PATENT OFFICE 2,330,573

SNAP FASTENER SOCKET

Jean Emile François Gobin dit Daudé, Neuilly, Seine, France; vested in the Alien Property Custodian Application October 8, 1941, Serial No. 414,192
In France March 1, 1941

9 Claims. (Cl. 24—218)

My invention relates to snap fastener sockets with independent spring means, for instance made of metal wire, of the kind which are attached to the cloth or like supporting article by means of prongs provided on an annular cap disposed on the opposite face of the cloth, the said prongs being passed through the cloth and engaging an annular locking chamber of the socket wherein they are bent by pressure.

The main object of my invention is to provide a snap fastener socket assembly of the kind above referred to which is more efficient in practice than the known devices.

In the annexed drawings:

Fig. 1 is an axial section of a snap fastener socket assembly according to my invention.

Fig. 2 is a similar view illustrating the corresponding stud engaged into the socket.

Fig. 3 illustrates in axial section a modified form of socket according to my invention.

Figs. 4 to 7 are perspective views with parts in section showing further modifications of my invention.

Figure 5:
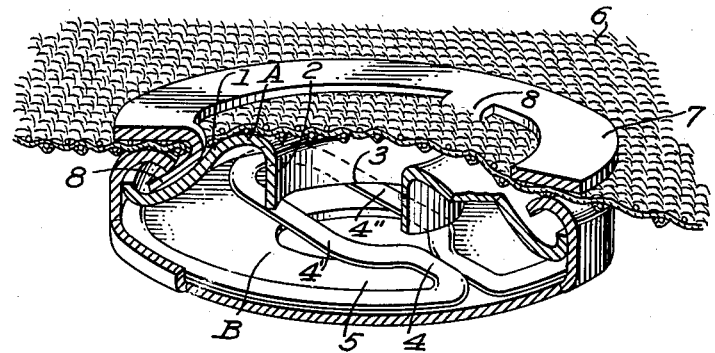

In order to facilitate the following description the face of the socket comprising the aperture adapted for engagement with the stud will be referred to as the lower or rear face, while the opposite face will be the upper or front face.

The socket assembly shown in Figs. 1 and 2 comprises a body portion A having a curved annular riveting front face 1 with a depressed inner part forming an open cup 2, the bottom edge of which is adapted to act as an upper or front abutment 3 for the resilient wire 4 forming the spring means. The latter is formed as a split ring, the outer diameter of which is, in use, always greater than the inner diameter of abutment 3.

The split ring 4 is also retained by a lower or rear abutment 5 formed by the inner edge of a base member B so shaped as to correspond to member A. The periphery of member B is turned inwardly around the outer edge of member A, to form a retaining ring as shown, the outer edge of member B being in close proximity to but separated from the flaring riveting face 1.

The socket thus formed by members A and B is fixed to the cloth or like support 6 by means of an annular setting cap 7 provided with spaced prongs 8 extending rearwardly. When cap 7 is pressed against the socket member, prongs 8 are passed through the cloth and engaged against the curved riveting face 1, they are bent and deflected outwardly and penetrate into the annular locking chamber left between member A and the inturned outer edge of member B.

As shown in Fig. 2, the stud member C is inserted into the socket A—B against the action of the resilient split ring 4 which is axially retained between abutments 3 and 5 but is free to move radially. Split ring 4 embraces the neck of the stud after the head has been inserted. The head of the stud is retained against transverse displacements by the edge of the aperture of cup 2.

The lower circular portion of member B preferably projects below the rear face of abutment 5 and contacts the base of the stud member C.

In the modification illustrated in Fig. 3, the spring means are also in the form of a resilient split ring 4, but this ring is housed within a circular groove 9 formed in the substantially cylindrical inner portion 2 of member A, the said portion being S shaped in axial section, as shown. The walls of groove 9 form the axial abutments 3 and 5 for ring 4, while the ungrooved part of portion 2 forms a guide preventing transverse displacements of the stud head. Member B of Figs. 1 and 2 is dispensed with and the outer edge of member A is turned inwardly on the front to form the annular locking chamber adapted to receive prongs 8 when the socket assembly is set on cloth 6.

In Fig. 4 the spring means 4 are in the form of a resilient fork the arms 4' and 4'' of which are elastically opened by the stud. Member B has a flat bottom 5 on which spring 4 is adapted to rest, said bottom having a central aperture for the stud head. The outer edge of member B is turned upwardly and inwardly above or in front of the outer edge of member A as in the case of Figs. 1 and 2 to form an annular locking chamber to receive prongs 8. The inner part 2 of member A is turned rearwardly and is cylindrical; its edge 3 acts as the upper or front abutment for arms 4' and 4'', while the cylindrical part forms a guide preventing transverse displacements of the stud.

The end of each arm 4' or 4'' is bent at 180° to form a rectilinear branch such as 10' substantially parallel to and spaced from arms 4' and 4'' respectively, the said branch terminating into a curved portion contacting the outer cylindrical wall of member B. Two diametrically opposed portions are cut in bottom 5 and turned upwardly and inwardly so as to form two lugs 11' and 11'' slightly sloping inwardly as shown.

When alone and at rest, the spring 4 is larger in diameter than bottom 5 of member B and is therefore inserted in the compressed state. But at the same time the two branches such as 10' slide against lugs 11' and 11", which opens the resilient fork 4'—4" against the compression of the spring up to a value suitable with respect to the size of the stud.

In the modification of Fig. 5, arms 4' and 4" are bent towards each other so as to touch one another. They are thereafter turned apart along the outer edge of bottom 5 where they are clamped between the latter and the outer edge of member A.

Figure 6:
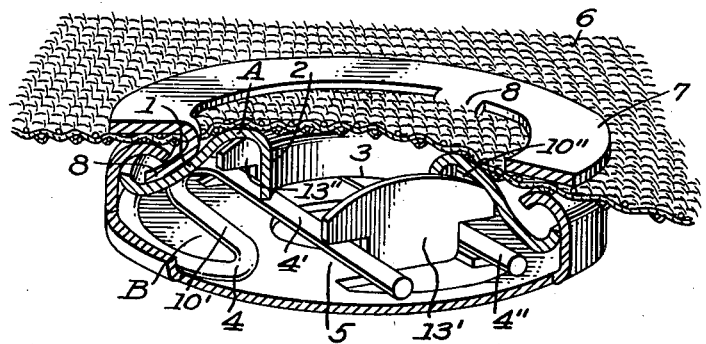
Figure 7:
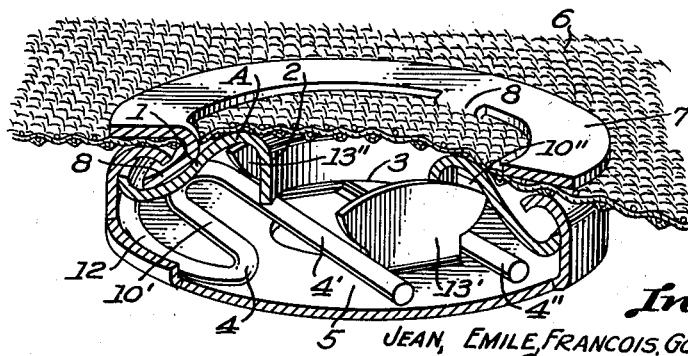

In Figs. 6 and 7, spring 4 comprises an arcuate circular portion clamped along the outer edge of bottom 5, the free ends being turned twice at 180° in opposite directions, as shown, and terminating into two parallel arms 4' and 4" adapted to coact with the stud member. Arms 4' and 4" are axially retained by bottom 5 and edge 3 as in the constructions of Figs. 4 and 5. Two T-shaped tongues 13' and 13" are cut in bottom 5 and are turned upwardly between the ends of arms 4' and 4". Tongues 13' and 13" form abutments limiting the movement of arms 4' and 4" towards the centre of the socket.

In the socket shown in Fig. 6, tongues 13' and 13" are cut in the vicinity of the periphery of bottom 5 and are turned inwardly, i. e., about their innermost side, whereas in Fig. 7, which shows a substantially similar construction, tongues 13' and 13" are cut in the central portion of bottom 5 and are turned outwardly, i. e., about their outermost side. It will be observed that in the case of Fig. 7, tongues 13' and 13" are in part formed of metal cut within the central aperture of the socket.

The socket member according to my invention is reduced in thickness and cheap to manufacture. The spring member is well protected and not liable to be damaged.

It will be understood that the above description has been given only by way of example and does not limit my invention the details of which may vary within the ambit of the appending claims.

I claim:

1. A snap fastener socket comprising substantially flat stud-engaging spring means, a first member having a curved annular riveting face and a central portion in co-axial relation with said riveting face, said portion forming an abutment for said spring means against axial displacement in one direction, a second member forming a substantially flat circular bottom with an apertured central portion in co-axial relation with said riveting face, said bottom forming an abutment for said spring means against axial displacement in the reverse direction with respect to said first-named abutment, and said second named member having its outer edge turned around the outer edge of said first-named member close to but in spaced relation with respect to said riveting face so as to form an annular locking chamber.

2. In a snap fastener socket as claimed in claim 1, said stud-engaging spring means being in the form of a resilient fork.

3. In a snap fastener socket as claimed in claim 1, said stud-engaging spring means being in the form of a resilient fork with the ends of the fork arms bent so as to form branches running parallel to and spaced from said arms but in the opposite direction and said bottom being provided with abutments for said branches.

4. A snap fastener socket comprising a first member having a curved annular riveting front face and a substantially cylindrical central portion extending rearwardly, a second member forming a substantially flat circular bottom with a central aperture in co-axial relation with said substantially cylindrical portion, said second member having its outer edge turned around the outer edge of said first-named member close to but in spaced relation with said riveting face so as to form an annular locking chamber, stud-engaging spring means formed of a resilient wire disposed between said members, said wire being so bent as to form an arcuate portion clamped between said members along the circular edge of said bottom, the ends of said portion forming two S-shaped flat springs having their terminal branches substantially parallel and in spaced and symmetrical relation with respect to the axis of said bottom and abutments on said bottom limiting elastic displacement of said terminal branches towards each other.

5. In a snap fastener socket as claimed in claim 4, said abutments being formed of portions cut in said bottom and turned frontwardly about their inner edge.

6. In a snap fastener socket as claimed in claim 4, said abutments being formed of portions cut in said bottom and turned frontwardly about their outer edge.

7. In a snap fastener socket as claimed in claim 4, said abutments being formed of portions cut out of the bottom for forming said central aperture in the latter and turned frontwardly about their outer edge.

8. A snap fastener socket comprising a first member having a curved annular riveting face and a substantially tubular central portion in co-axial relation with said riveting face, a second member forming a substantially flat circular bottom with an apertured central portion in co-axial relation with said riveting face, said second member having its outer edge turned around the outer edge of said first member close to but in spaced relation with respect to said riveting face so as to form an annular locking chamber, and said second member having two opposite cut portions turned frontwardly so as to form two lugs projecting from said flat circular bottom, and substantially flat stud-engaging spring means in the form of a resilient fork with the ends of the fork arms turned twice at 180° and in opposite directions so as to form two branches extending parallel to but in spaced relation from said fork arms, said branches pressing elastically against said lugs in an inward direction, and two other arcuate branches pressing against the circular edge of said bottom, said resilient fork being retained in axial direction by said bottom and by the edge of said substantially tubular central portion.

9. In a snap fastener socket as claimed in claim 8, said lugs sloping inwardly so as to open said resilient fork by sliding engagement with said two first-named branches when said stud-engaging spring means are placed on said circular bottom.

JEAN EMILE FRANÇOIS GOBIN DIT DAUDÉ.